US009004172B2

(12) United States Patent
Carlson et al.

(10) Patent No.: US 9,004,172 B2
(45) Date of Patent: Apr. 14, 2015

(54) SYSTEMS, MATERIALS, AND METHODS FOR RECOVERING MATERIAL FROM BEDROCK USING SUPERCRITICAL ARGON COMPOSITIONS

(75) Inventors: William B. Carlson, Seattle, WA (US); Gregory D. Phelan, Cortland, NY (US)

(73) Assignee: Empire Technology Development LLC, Wilmington, DE (US)

( * ) Notice: Subject to any disclaimer, the term of this patent is extended or adjusted under 35 U.S.C. 154(b) by 328 days.

(21) Appl. No.: 13/512,700

(22) PCT Filed: Sep. 1, 2011

(86) PCT No.: PCT/US2011/050236

§ 371 (c)(1), (2), (4) Date: May 30, 2012

(87) PCT Pub. No.: WO2013/032482

PCT Pub. Date: Mar. 7, 2013

(65) Prior Publication Data

US 2013/0056205 A1 Mar. 7, 2013

(51) Int. Cl.

*E21B 43/267* (2006.01)
*C09K 8/70* (2006.01)
*C09K 8/80* (2006.01)

(52) U.S. Cl.

CPC ................. *E21B 43/267* (2013.01); *C09K 8/70* (2013.01); *C09K 8/80* (2013.01)

(58) Field of Classification Search

None
See application file for complete search history.

(56) References Cited

U.S. PATENT DOCUMENTS

| | | | | |
|---|---|---|---|---|
| 3,937,283 A * | 2/1976 | Blauer et al. | .................. | 166/307 |
| 4,186,802 A | 2/1980 | Perlman | | |
| 4,566,539 A | 1/1986 | Perlman | | |
| 5,325,921 A | 7/1994 | Johnson et al. | | |
| 6,260,621 B1 | 7/2001 | Furman et al. | | |
| 7,059,405 B2 * | 6/2006 | Farabee et al. | ............. | 166/250.1 |
| 7,980,312 B1 | 7/2011 | Hill et al. | | |

(Continued)

FOREIGN PATENT DOCUMENTS

| | | |
|---|---|---|
| DE | 19903243 A1 | 8/2000 |
| EP | 1844850 A1 | 10/2007 |

(Continued)

OTHER PUBLICATIONS

International Search Report and Written Opinion for PCT/US2011/050236 dated Feb. 1, 2012.

(Continued)

*Primary Examiner* — Zakiya W Bates
(74) *Attorney, Agent, or Firm* — Foley & Lardner LLP

(57) ABSTRACT

A material to be used for hydraulic fracturing, comprising argon maintained as a supercritical fluid, and a proppant. The material may also include any one of a variety of gels, foaming agents, and/or gases. The material may be used in a system to recover resources from bedrock, the system comprising the fracturing material, at least one mixer, a pump to inject the material into a bore well, and a recovery unit to recover the resource from the well. The material and system may be used in a variety of methods for extracting resources from bedrock, the method including mixing the proppant with the supercritical argon to form a mixture, pumping the mixture into a bore well, and recovering the resource from the bore well. Additionally, the material and bore well may comprise a structure used in the extraction of resources from bedrock.

26 Claims, 6 Drawing Sheets

(56) References Cited

U.S. PATENT DOCUMENTS

| | | | | |
|---|---|---|---|---|
| 8,485,257 | B2 * | 7/2013 | Bali et al. | 166/303 |
| 2004/0134515 | A1 | 7/2004 | Castrucci | |
| 2004/0198622 | A1 | 10/2004 | Korzenski et al. | |
| 2004/0224865 | A1 | 11/2004 | Roeder et al. | |
| 2004/0266635 | A1 | 12/2004 | Korzenski et al. | |
| 2005/0028927 | A1 | 2/2005 | Basceri et al. | |
| 2005/0167841 | A1 | 8/2005 | PaPa Rao et al. | |
| 2006/0166837 | A1 | 7/2006 | Lin et al. | |
| 2007/0036977 | A1 | 2/2007 | Sinclair et al. | |
| 2007/0051517 | A1 | 3/2007 | Surjaatmadja et al. | |
| 2007/0131423 | A1 | 6/2007 | Teng | |
| 2007/0204995 | A1 | 9/2007 | Hofman et al. | |
| 2007/0261844 | A1 | 11/2007 | Cogliandro et al. | |
| 2010/0032171 | A1 | 2/2010 | Bali et al. | |
| 2010/0185039 | A1 * | 7/2010 | Hoag et al. | 588/320 |
| 2010/0227381 | A1 * | 9/2010 | Hoag et al. | 435/262.5 |
| 2011/0066380 | A1 * | 3/2011 | Hager et al. | 702/8 |
| 2011/0098622 | A1 * | 4/2011 | Hatanaka et al. | 602/52 |

FOREIGN PATENT DOCUMENTS

| | | |
|---|---|---|
| JP | 2003-209088 | 7/2003 |
| RU | 2223654 C1 | 2/2004 |
| WO | WO2009/006189 A2 | 1/2009 |

OTHER PUBLICATIONS

Carbon Dioxide as a Fire Suppressant: Examining the Risks, United States Environmental Protection Agency, EPA430-R-00-002, Feb. 2000 (www.epa.gov/ozone).

Toxicity of Carbon Dioxide Gas Exposure, $CO_2$ Poisoning Symptoms, Carbon Dioxide Exposure Limits, and Links to Toxic Gas Testing Procedures, InspectAPedia (www.inspectapedia.com/hazmat/CO2gashaz.htm), (printed from internet Feb. 13, 2012).

Water Well Drilling in the U.S.: Market Research Report, IBISWorld (www.ibisworld.com/industry/default.aspx?indid=202), (printed from internet Feb. 13, 2012).

Illinois Department of Public Health, Environmental Health, Water Wells (www.idgh.state.il.us/envhealth/waterwells.htm), (printed from internet Feb. 13, 2012).

Water Well Drilling Market Report, HighBeam Business, (http://business.highbeam.com/industry-reports/mining/water-well-drilling), (printed from internet Feb. 14, 2012).

The China Greentech Report 2009, Clean Water Sector, www.china-greentech.com.

ANCSIN, Studies of Phase Changes in Argon, IOPScience, Division of Physics National Research Council of Canada, Ottawa, Canada, *Metrologia* (1973), 9(4):147 (Abstract).

Day et al., Swelling of Coals by Supercritical Gases and Its Relationship to Sorption, *Energy Fuels* (2010), 24(4):2777-2783 (Abstract).

Goldfarb et al., Dielectric and volumetric properties of supercritical carbon dioxid(1)+methanol(2) mixtures at 323.15K, *Fluid Phase Equilibria* (Jun. 1999), 158-160:1011-1019 (Abstract).

Henderson et al., Phase Diagram and *pV* Isotherms of Argon, *J Chem Phys* (1969), 51:5420 (Abstract).

Kim et al., Phase behaviors and fractionation of polymer solutions in supercritical carbon dioxide, *The Journal of Supercritical Fluids* (Jun. 15, 1998), 13(1-3):99-106 (Abstract).

Liang et al., Extraction of Petroleum Hydrocarbons from Soil Using Supercritical Argon, *Anal Chem* (Feb. 1, 1998), 70(3):616-622 (Abstract).

Prager et al., Methane rotation and the phase diagram of $CH_4$/xenon, *J Chem Phys* (1993), 99(3):2052 (Abstract).

Saija et al., High-pressure phase diagram of the exp-6 model: The case of Xe, *Am Phys Soc* (Oct. 6, 2004), 72(2) (Abstract).

Wang et al., Nuclear Laundry Using Supercritical Fluid Solutions, *Ind Eng Chem Res* (2004), 43(7):1580-1585 (Abstract).

Liang et al., Extraction of Petroleum Hydrocarbons from Soil Using Supercritical Argon, *Anal. Chem.* (Feb. 1, 1998), 70(3):616-622.

Brenhouse, H., "China's Water Needs Create Opportunities," The New York Times, Oct. 26, 2009, Retrieved from http://www.nytimes.com/2009/10/27/business/energy-environment/27iht-rbobcan.html, 3 pages.

Brookshire, D. S., et al., "Market prices for water in the semiarid West of the United States," 2004, Water Resources Research, Vol. 40, W09SO4, doi:10.1029/2003WR002846, pp. 1-8.

Brown, L. R., "Feeding Everyone Well: Raising Water Productivity," Eco-Economy: Building an Economy for the Earth Chapter 7, Earth Policy Institute, Retrieved from http://web.archive.org/web/20101206004156/http://www.earth-policy.org/books/eco/eech7__ss4, accessed on Sep. 12, 2014, 2 pages.

Brown, L. R., "Signs of Stress: Climate & Water: Falling Water Tables," Eco-Economy: Building an Economy for the Earth Chapter 2, Earth Policy Institute, Retrieved from http://www.earth-policy.org/index.php?/books/eco/eech2__ss7, accessed on Sep. 12, 2014, 2 pages.

Ching, L., "The privatization of water supply in China," Globalization Monitor, Retrieved from http://www.globalmon.org.hk/content/privatization-water-supply-china, posted on Dec. 8, 2011, 2 pages.

Obermueller, A., "Water: More Important to China Than Oil," Street Authority, Retrieved from http://web.archive.org/web/20110709211156/http://seekingalpha.com/article/244765-water-more-important-to-china-than-oil, posted on Jan. 4, 2011, 1 page.

UNICEF, "Progress since the World Summit for Children," A Statistical Review, Sep. 2001, pp. 1-32.

United Nations Environment Programme, "The Councillor as Guardian of the Environment," Essay and Workshop, Retrieved from http://web.archive.org/web/20071009001901/http://www.unep.or.jp/ietc/Publications/techpublications/TechPub-7/challenge.asp, accessed on Sep. 12, 2014, 9 pages.

"Water in China," Facts and Details, Retrieved from http://web.archive.org/web/20100919164109/http://factsanddetails.com/china.php?itemid=317&catid=13&subcatid=85, accessed on Sep. 12, 2014, 5 pages.

Wilson, S., "Will water shortages end China's economic boom?," Money Week, Retrieved from http://moneyweek.com/will-water-shortages-end-chinas-economic-boom/, posted on Jan. 16, 2006, 6 pages.

Yardley, J., "Beneath Booming Cities, China's Future Is Drying Up," Sep. 28, 2007, Retrieved from http://web.archive.org/web/20101124145357/http://www.nytimes.com/glogin?URI=http://www.nytimes.com/2007/09/28/world/asia/28water.html&OQ=_rQ3D1Q26pagewantedQ3Dprint&OP=5a4d83Q2FHb@Q23HQ5E__PIE__mAHAQ60Q60xHQ60)HAdHb__EGQ5EHZI,ZHAdbZm@EfQ7CmeG, 7 pages.

* cited by examiner

SYSTEMS, MATERIALS, AND METHODS FOR RECOVERING MATERIAL FROM BEDROCK USING SUPERCRITICAL ARGON COMPOSITIONS

Claim of Priority

This application is a U.S. national stage filing under 35 U.S.C. §371 of International Application No. PCT/US2011/050236filed Sep. 1, 2011entitled "Systems, Materials, and Methods for Recovering Material from Bedrock Using Supercritical Argon Compositions," the disclosure of which is incorporated by reference in its entirety.

BACKGROUND

Hydraulic fracturing (also termed "fracking") is a method of removing material from strata or zones within bedrock using a pressurized material pumped into a bore well drilled into the bedrock. The pressurized material (also termed "fracking material" or "fracking mixture") diffuses into small openings or fissures within bedrock zones and expands them into larger fracture structures. These larger fractures allow the underground material to be withdrawn from the bedrock more readily than if the original fissures were not enlarged. The material recovered from the underground source is then pumped into facilities where the fracking mixture can be readily separated from the material recovered from the bedrock.

Fracking methods have been used extensively in the recovery of petroleum related materials such as natural gas and oil from oil shale. Another application for this technique may be found in the recovery of water from water-bearing zones or strata within bedrock. The use of hydraulic fracturing for water recovery may prove beneficial, especially in regions lacking readily accessible surface or near-surface water, and where deeper aquifers may be found.

Unlike petroleum materials obtained in this manner, water extracted by means of fracking must be potable for human, animal, and agricultural use. Therefore, a fracking mixture used to recover water must have a minimal effect on water potability.

SUMMARY

In an embodiment, a material for hydraulic fracturing includes a supercritical fluid comprising at least about 95% argon and at least one proppant. Additional embodiments of the hydraulic fracturing material may include at least a portion of argon-37 ($^{37}$Ar), a gas, a gel, and/or a foaming agent.

In an embodiment, a system for extracting material from bedrock includes a source of a supercritical fluid comprising at least about 95% argon, a source of at least one proppant, a mixing device configured to mix the supercritical fluid and the proppant into a fracking mixture, a bore well into the bedrock, a pump configured to pump the fracking mixture into the bore well, and a recovery unit configured to recover the material from the bedrock.

In an embodiment, a method for extracting material from bedrock comprises providing a source of a supercritical fluid comprising at least about 95% argon, providing a source of at least one proppant, mixing the supercritical fluid and the proppant to provide a fracking mixture, pumping the fracking mixture into a bore well, and recovering the material from the bedrock.

In another embodiment, a method for recovering water from bedrock comprises providing a bore well extending from a land surface to, into or through at least one zone of bedrock containing water, providing a source of a supercritical fluid comprising at least about 95% argon, providing a source of at least one proppant, mixing the supercritical fluid and the proppant to provide a fracking mixture, pumping the fracking mixture into the bore well, allowing the fracking mixture to develop a number of fracture structures within the bedrock, and recovering water from the bore well.

In another embodiment, a structure for recovering water from bedrock comprises a bore well extending from a land surface to, into or through at least one zone of bedrock containing water, and a fracking mixture disposed within the bore well, the fracking mixture comprising, a supercritical fluid comprising at least 95% argon, and at least one proppant.

DETAILED DESCRIPTION

Hydraulic fracturing ("fracking") methods are most commonly associated with recovery of petroleum related materials from deep bedrock structures. The fracking material used in the process may be a complex mixture incorporating a base fluid, proppants, gels, and breakers, among other additives. In some petroleum-related fracking procedures, fracking material components have included diesel fuel, isopropanol, hydrochloric acid, and other components with potentially hazardous properties. Such fracking materials, if not completely removed during a recovery operation, may pose an environmental hazard if they leach into local groundwater. The hazardous properties of such fracking materials is even more important if subsurface water is being recovered, since it may not be possible to remove all the fracking material from the water. It is therefore desirous to develop a fracking material that may pose a minimal hazard both to the environment and to potential consumers of water recovered by this method. The present disclosure is directed to the use of supercritical argon as the basis for the fracking material. Argon is an inert gas, and has no specifically identified toxicity to animals or plants. Argon in the supercritical state may be used as a low viscosity carrying fluid for proppants to assist in fracturing fissures in subsurface aquifers, thereby allowing improved recovery of water or other materials from bedrock.

Figure 1:
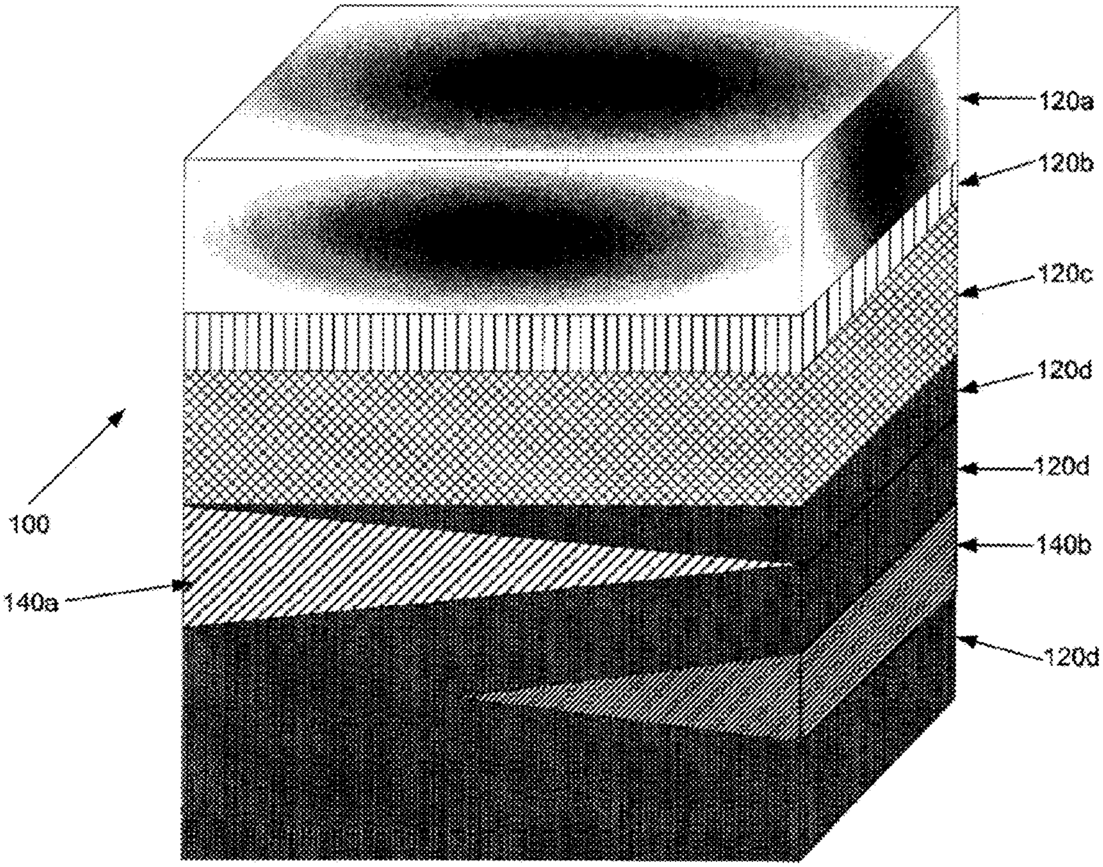
FIG. 1 illustrates a section of bedrock comprising multiple zones or strata in accordance with the present disclosure.
Figure 2A:
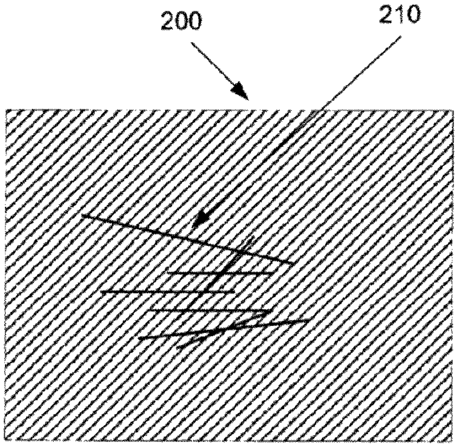
FIG. 2*a* illustrates a water-bearing zone of bedrock comprising multiple fissures in the zone prior to hydraulic fracturing in accordance with the present disclosure.

FIGS. 1 and 2*a* illustrate bedrock compositions in which hydraulic fracturing can provide an effective way to extract material from bedrock. In FIG. 1, a cross-section of bedrock (100) is displayed illustrating multiple overlaying zones or strata. Some of the zones may not contain material that may be extractable using the fracking process (120*a-d*). A surface layer (120*a*), for example may comprise silt, gravel, or pebbled clay. Deeper layers may include dolomite, shale, and siltstone (120*b, c, d*). Other zones may contain extractable material such as water. In one embodiment, water may be trapped in deep aquifers comprising sandstone (140*a*, 140*b*). While bedrock strata or zones may overlay each other completely, as illustrated with zone (120*a*) completely overlaying zone (120*b*), zones may interdigitate or intrude into one another. As illustrated, a water-bearing zone (140*a*) may intrude into a non-water-bearing zone (120*d*). In addition, multiple water-bearing zones may overlay each other, separated by a non-water-bearing zone as illustrated by zone (140*a*) overlaying zone (140*b*) separated by a third zone (120*d*). Although water may be one material available for extraction by hydraulic fracturing, it is understood that other materials of interest may include precious metals, natural gas, or other non-aqueous materials.

Figure 2B:
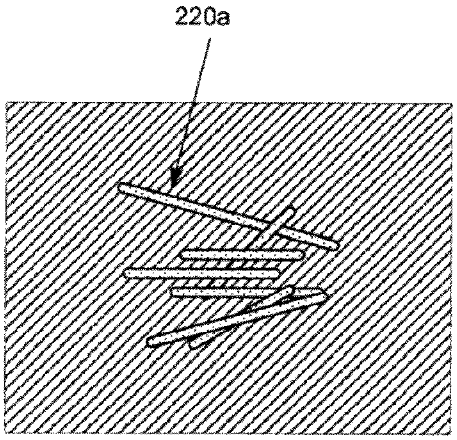
FIG. 2*b* illustrates a water-bearing zone of bedrock after hydraulic fracturing in which the fissures have been expanded into fracture structures in accordance with the present disclosure.
Figure 2C:
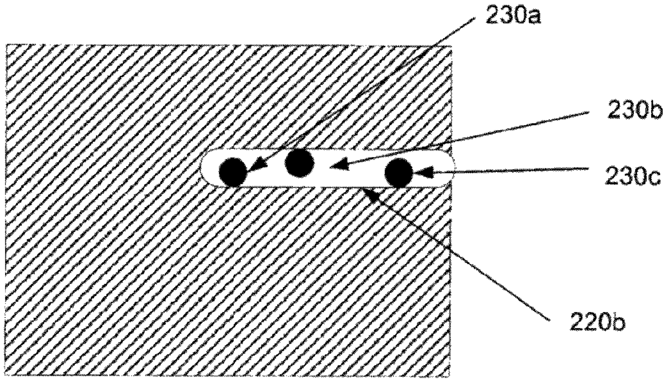
FIG. 2*c* illustrates an expanded view of a fracture structure including proppant particles in accordance with the present disclosure.

FIG. 2*a* illustrates an expanded view of one section of a water-bearing zone (200). In particular, the bedrock in this zone comprises fissures or narrow cracks (210) in which the material of interest, such as water, may collect. These fissures may be too narrow to permit water or other material to be easily extracted through a surface-drilled bore well. The fissures, however, may be enlarged using a fracking material or fracking mixture. A fracking material introduced under pressure through a bore well may widen or enlarge the fissures into wider fracture structures. FIG. 2*b* illustrates these enlarged fracture structures (220*a*) caused by the fracking mixture. If the fracking mixture solely comprises a liquid, gas, or other material readily removed from the bedrock, the fracture structures can collapse, thereby preventing continued extraction of the material of interest. Frequently, the fracking mixture also comprises some material (a proppant) that is left within the fracture structures to keep the fracture structures open. FIG. 2*c*, an expanded view of FIG. 2*b*, illustrates the effect of such proppants on the fracture structures. The proppant particles (230*a-c*) remain within the fracture structure (220*b*), keeping the fracture structure open.

A material for hydraulic fracturing (or a fracking material or fracking mixture) can comprise a variety of materials and components. In one embodiment, the fracking material comprises a supercritical fluid comprising at least 95% argon, in addition to at least one proppant material. A supercritical fluid is a material that shares properties of both liquids and gases, and is effective for penetrating narrow fissures within bedrock. A supercritical fluid is characterized by a critical temperature and critical pressure, which are the minimal temperature and pressure at which the supercritical fluid can be maintained. For argon, the critical temperature is about −122 degrees C., and the pressure is about 50 atmospheres (5,066 KPa). An embodiment of the hydraulic fracturing material comprises a supercritical fluid comprising at least 95% argon maintained at a temperature above about −122 degrees Celsius, a pressure above about 50 atmospheres (5,066 KPa), and at least one proppant. Another embodiment of the hydraulic fracturing material comprises at least 95% argon maintained at a temperature between about −122 degrees Celsius and about 175 degrees Celsius, at a pressure above about 50 atmospheres (5,066 KPa), and at least one proppant. In another embodiment, some portion of the argon may comprise argon-37. Argon-37 may be monitored to determine if any residual fracking material diffuses from its introduction site to other areas in the environment.

In some embodiments, the proppant comprises, as non-limiting examples, sand grains, resin-coated sand, glass, high-strength bauxite ceramic material, and/or high strength non-bauxite ceramic material. In some embodiments, the proppant comprises, as non-limiting examples, a plastic, such as Bakelite, melamine, phenols, phenolics, epoxy, styrenics, acrylics, vinyls, phenol-formaldehyde, tetrafluroethylene, urea-formaldehyde, novolac, polycarbonate, lexan, benzoxazine, polyesters, polyamides, nylon, polyetherimide, polybenzimidazole, polyamide-imide, polyvinyl chloride, benzoguanamine, urea, and/or glycoluril.

In some further embodiments, the proppant may have, as non-limiting examples, a spherical, ellipsoidal, rectangular, polygonal, jagged, or uneven shape. In some embodiments, the proppant has a size of about 30 nm to about 3 mm. In some further embodiments, the supercritical argon is maintained at a pressure—greater than about 50 atmospheres (5,066 KPa)—and at a temperature—greater than about −122 degrees Celsius and below about 175 degrees Celsius—so that the density of the supercritical argon has approximately the same density of the proppant mixed with it.

In another embodiment, the fracking material may further comprise a gas characterized as being environmentally benign and non-toxic. Non-limiting examples of such a gas include noble gases (krypton or xenon), carbon dioxide, nitrogen, and water vapor.

In another embodiment, the fracking material may also include a gel. Such a gel may include, as non-limiting examples, an inorganic gel, a wax, and/or an oligomer. The gel may comprise a linear polymer, non-limiting examples being a functional polyethylene, polypropylene, polyolefin, polyethylene oxide, polypropylene oxide, copolymers of polyethylene oxide and polypropylene oxide, vinyl ether, polyesters, polyamides, polycarbonate, acrylics, styrenics, vinyl ketones, protein, amino acids, collagen, pectin, gelatin, agarose, amylose, poly lactic acid, and/or poly galactic acid. In an alternative embodiment, the gel may comprise a branched or cross-linked polymer, with non-limiting examples being polyurethane, polyurea with a carboxylate functionality, cellulostics, branched or cross-linked acrylics, low molecular weight epoxy resins, branched or cross-linked polyesters, branched or cross-linked polyamides, branched or cross-linked polycarbonate, branched or cross-linked vinyl ketones, fluorinated resins, branched or cross-linked protein, branched or cross-linked amino acids, branched or cross-linked collagen, branched or cross-linked pectin, branched or cross-linked gelatin, branched or cross-linked agarose, and/or branched or cross-linked. amylose. The amount of gel included in the hydraulic fracturing material may be selected to impart a desired viscosity to the fracking material.

In yet another embodiment, the fracking material may also include a foaming agent. A foaming agent may be included in the fracking material to reduce the amount of supercritical fluid in the fracking mixture. Non-limiting examples of such foaming agents include ceramic hollow microspheres, and/or plastic hollow microspheres. Other foaming agents may include non-toxic surfactants such as cocamide MEA, cocamidopropyl betaine, coceth-4, coceth-7, and coconut alcohol ethoxylate. Additionally, the supercritical argon may be maintained at a pressure and temperature so that the density of the supercritical argon is approximately the same as the density of the foaming agent.

The various embodiments of a fracking mixture as disclosed above may be incorporated into a system for extracting material from bedrock. While the material to be extracted may be water or comprise water, it is understood that the material may comprise other non-aqueous materials, non-limiting examples being precious metals and natural gas.

Figure 3A:
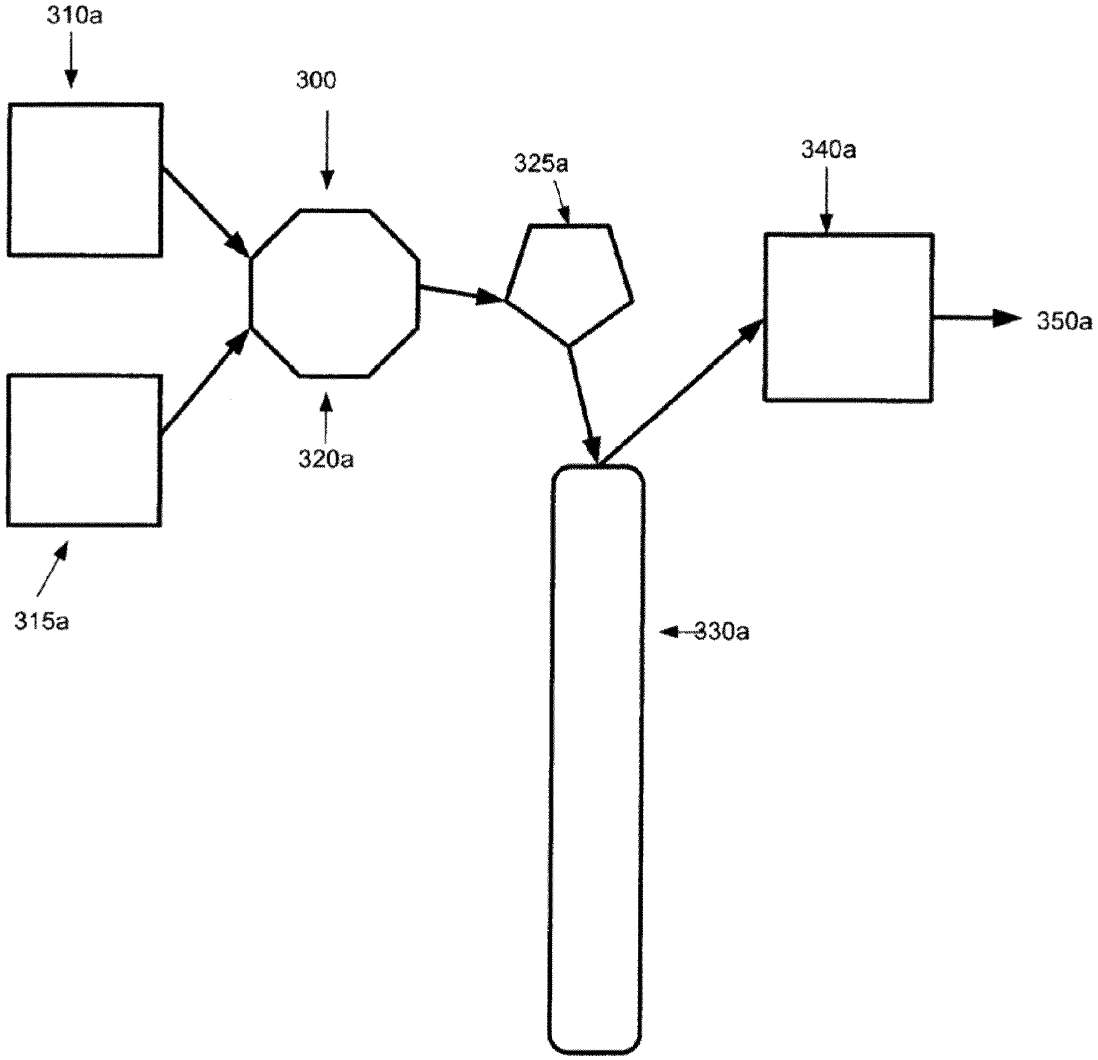
FIG. 3*a* illustrates one embodiment of a system for recovering material from a zone in bedrock in accordance with the present disclosure.

One embodiment of such a fracking system (300) is illustrated in FIG. 3*a*. The fracking system includes a source of argon (310*a*), a source of at least one proppant (315*a*), and a mixing device (320*a*) to mix the argon and proppant together to provide a fracking mixture. As disclosed above, the fracking mixture may comprise other components in addition to the argon (310*a*) and proppant (315*a*). While not explicitly illustrated in FIG. 3*a*, it is understood that mixing device (320*a*) can also be configured to mix other components into the fracking mixture including at least one gas, at least one gel, and/or at least one foaming agent. Such additional components may be supplied to the mixing device from sources specific to those components.

The fracking mixture may then be pumped into a bore well (330*a*) cut into the bedrock (not shown) through a pump (325*a*). The pump (325*a*) may be used to recover the material from the bore well (330*a*). The recovered material may then be placed in a recovery unit (340*a*) which allows the separation of the water (350*a*) from any residual components of the fracking mixture, or other material leached from the bedrock. The pump (325*a*) may comprise any suitable pump for the application including, as one non-limiting example, a bilge pump. In addition, the pump (325*a*) may attain a suitable pump rate and pressure for the application including, as non-limiting examples, a pump rate up to about 100 barrels per second (15.9 cubic meters per second) and a pumping pressure up to about 15,000 psi (103,421 KPa). While a single pump (325*a*) is illustrated in the figure, it is understood that additional pumps may be included. Such additional pumps may pump other materials into the bore well (330*a*) or else pump the water and residual fracking material from the well.

Figure 3B:
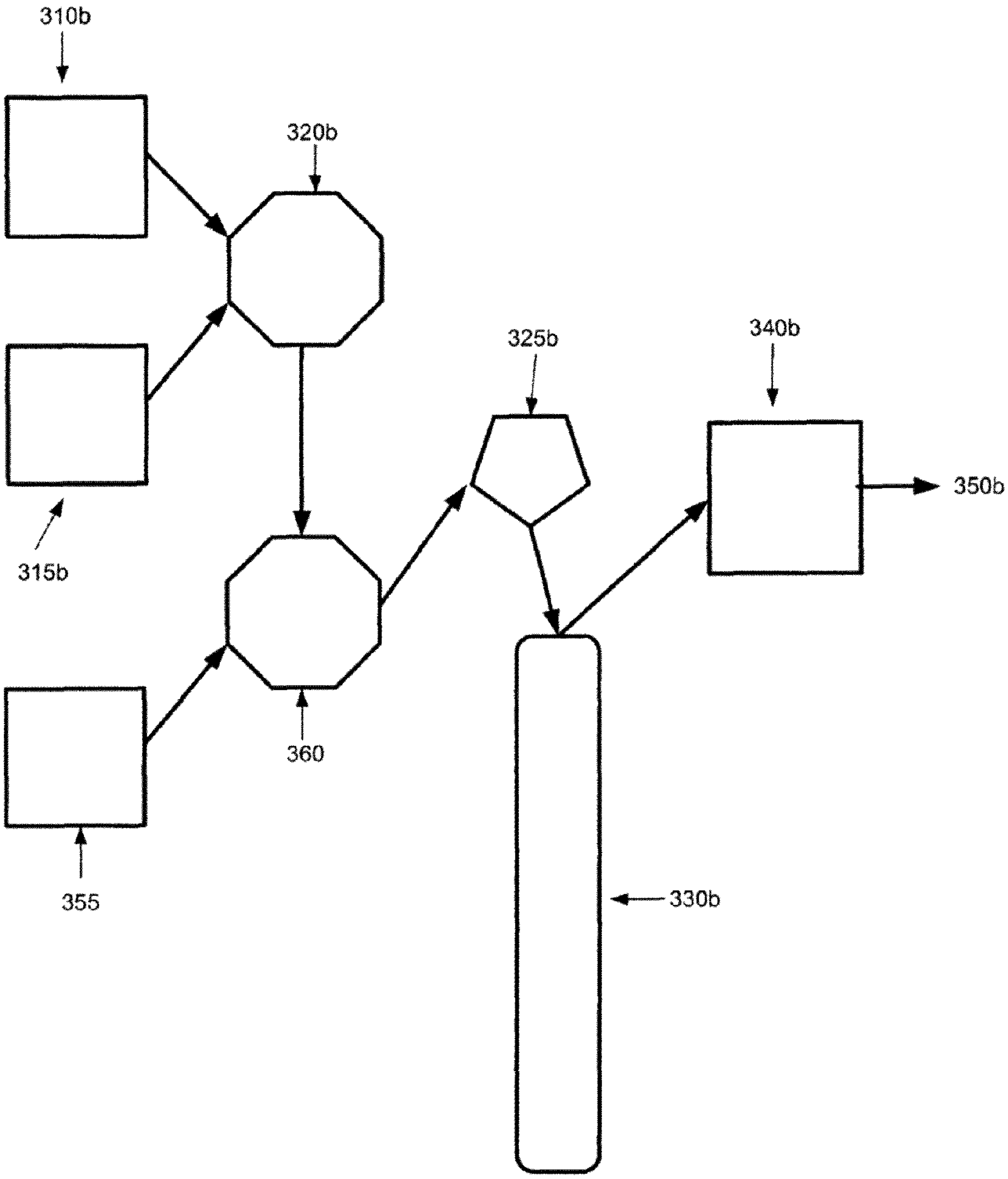
FIG. 3*b* illustrates another embodiment of a system for recovering material from a zone in bedrock in accordance with the present disclosure.

An alternative embodiment of a fracking system is illustrated in FIG. 3*b*. In this embodiment, the argon from its source (310*b*) is mixed in a mixing device (320*b*) with at least one proppant, obtained from its source (315*b*). The material produced by this first mixing device may then be further mixed with another component, such as a gas obtained from a gas source (355) in a separate mixing device (360). While not explicitly illustrated in FIG. 3*b*, it is understood that other components may be mixed into the fracking mixture through the operation of additional mixing devices. In addition, it is understood that there is no specific order of mixing such components. Such components may include at least one gel and/or at least one foaming agent. These components may be provided to the separate mixing devices from sources specific to them.

The fracking mixture may be introduced into a bore well (330*b*) through a pump (325*b*). The material recovered from the bore well may then be provided to a recovery unit (340*b*) in which the material, such as water (350*b*), is separated from any residual fracking mixture or other material leached from the bedrock. As described previously, multiple pumps may be used to introduce material into, or extra material from, the bore well (330*b*).

The fracking system disclosed above, and the fracking mixture also previously disclosed, may be used for extracting material from bedrock. While the material extracted from the bedrock may be water or comprise water, it is understood that the material can comprise non-aqueous materials, non-limiting examples being precious metals or natural gas. In one embodiment, a method for extracting material from bedrock comprises providing a source of a supercritical fluid comprising at least about 95% argon, providing a source of at least one proppant, mixing the supercritical fluid and the proppant to provide a fracking mixture, pumping the fracking mixture into a bore well, and recovering the material from the bedrock.

As previously disclosed, the fracking material may further comprise at least one gas, at least one gel, and/or at least one foaming agent. Alternative embodiments of the method may further include providing any one or more of these materials and mixing them into the fracking material. It is understood that mixing any of these additional materials may be accomplished by a single mixing device or multiple mixing devices. In addition, the order of mixing the components need not be specifically fixed. In an alternative embodiment, the argon comprises at least a portion of argon-37, and the method further includes tracing the argon-37 within the bedrock. As examples, tracing the argon-37 may be accomplished through sampling aquifer water through drilling into bedrock, or monitoring water seepage from springs. In another embodiment, the amount of gel included in the fracking mixture may be selected to impart a selected viscosity to the fracking mixture. In another embodiment, the temperature and pressure of the fracking mixture may be chosen so that the supercritical argon has a density about the same as the proppant. In yet another embodiment, the temperature and pressure of the fracking mixture may be chosen so that the supercritical argon has a density about the same as the foaming agent.

In another embodiment, the pumping step includes pumping the fracking mixture into the bore well at a pressure up to about 15,000 psi (103,421 KPa) and at a rate up to about 100 barrels per second (15.9 cubic meters per second).

The fracking system disclosed above, and the fracking mixture also previously disclosed, may be used for extracting water from bedrock. In one embodiment, a method for extracting water from bedrock comprises providing a bore well extending from a land surface to, into, or through at least one zone of bedrock bearing water, providing a source of a supercritical fluid comprising at least about 95% argon, providing a source of at least one proppant, mixing the supercritical fluid and the proppant to provide a fracking mixture, pumping the fracking mixture into the bore well, allowing the fracking mixture to develop a plurality of fracture structures within the bedrock, and recovering water from the bore well.

Figure 4:
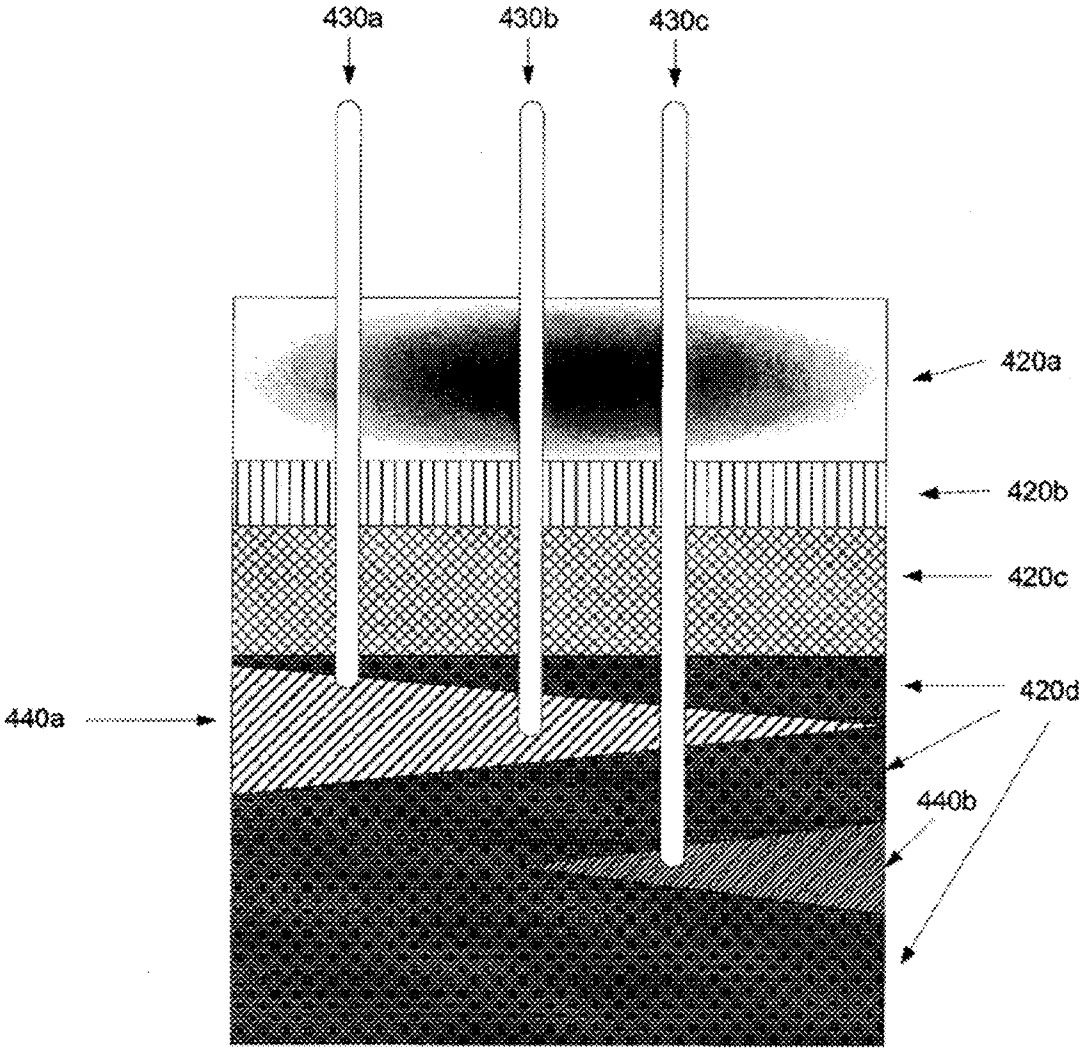
FIG. 4 illustrates various embodiments regarding the placement of bore wells into bedrock zones or strata in accordance with the present disclosure.

As previously illustrated, in FIG. 1, bedrock may comprise multiple water-bearing zones that may overlay each other, either directly or with a non-water-bearing zone between them. FIG. 4 illustrates how the bore well may be disposed with respect to these different geological layers. Non-water-bearing zones or strata (420*a-d*) may comprise, in non-limiting examples, loose gravel, dolomite or shale. Water-bearing zones (440*a, b*) may intrude into these strata and may overlay each other directly, or be separated by non water bearing zones (420*d*). A bore well may be drilled into the bedrock to various depths to retrieve water from one or multiple water-bearing zones. Thus, bore well (430*a*) exemplifies a bore well drilled just to the top of water-bearing zone (440*a*). The bore well may also be bored into the water-bearing zone (430*b*). Alternatively, the bore well (430*c*) may be bored through one water-bearing zone (440*a*) and into a second, underlying water-bearing zone (440*b*). As illustrated in FIGS. 2*a* and 2*b*, the original fissures in the water bearing zone (210) may be induced to expand into fracture structures (220*a, b*) under the pressure exerted by the fracking mixture.

As previously disclosed, the fracking mixture may further comprise other components including at least one gas, at least one gel, and/or at lest one foaming agent. Alternative embodiments of the method may further include providing any one or more of these materials and mixing them into the fracking material. It is understood that mixing any of these additional materials may be accomplished by a single mixing device or multiple mixing devices. In addition, the order of mixing the components need not be specifically fixed. In another embodiment, the argon in the fracking mixture may comprise at least a portion of argon-37, which may be traced within the bedrock using techniques previously disclosed. In another embodiment, the amount of gel included in the fracking mixture may be selected to impart a selected viscosity to the fracking mixture. In another embodiment, the temperature and pressure of the fracking mixture pumped into the bore well may be chosen so that the supercritical argon has a density about the same as the proppant. In yet another embodiment, the temperature and pressure of the fracking mixture pumped into the bore well may be chosen so that the supercritical argon has a density about the same as the foaming agent.

In another embodiment, the pumping step includes pumping the fracking mixture into the bore well at a pressure up to about 15,000 psi (103,421 KPa) and at a rate up to about 100 barrels per second (15.9 cubic meters per second).

Figure 5:
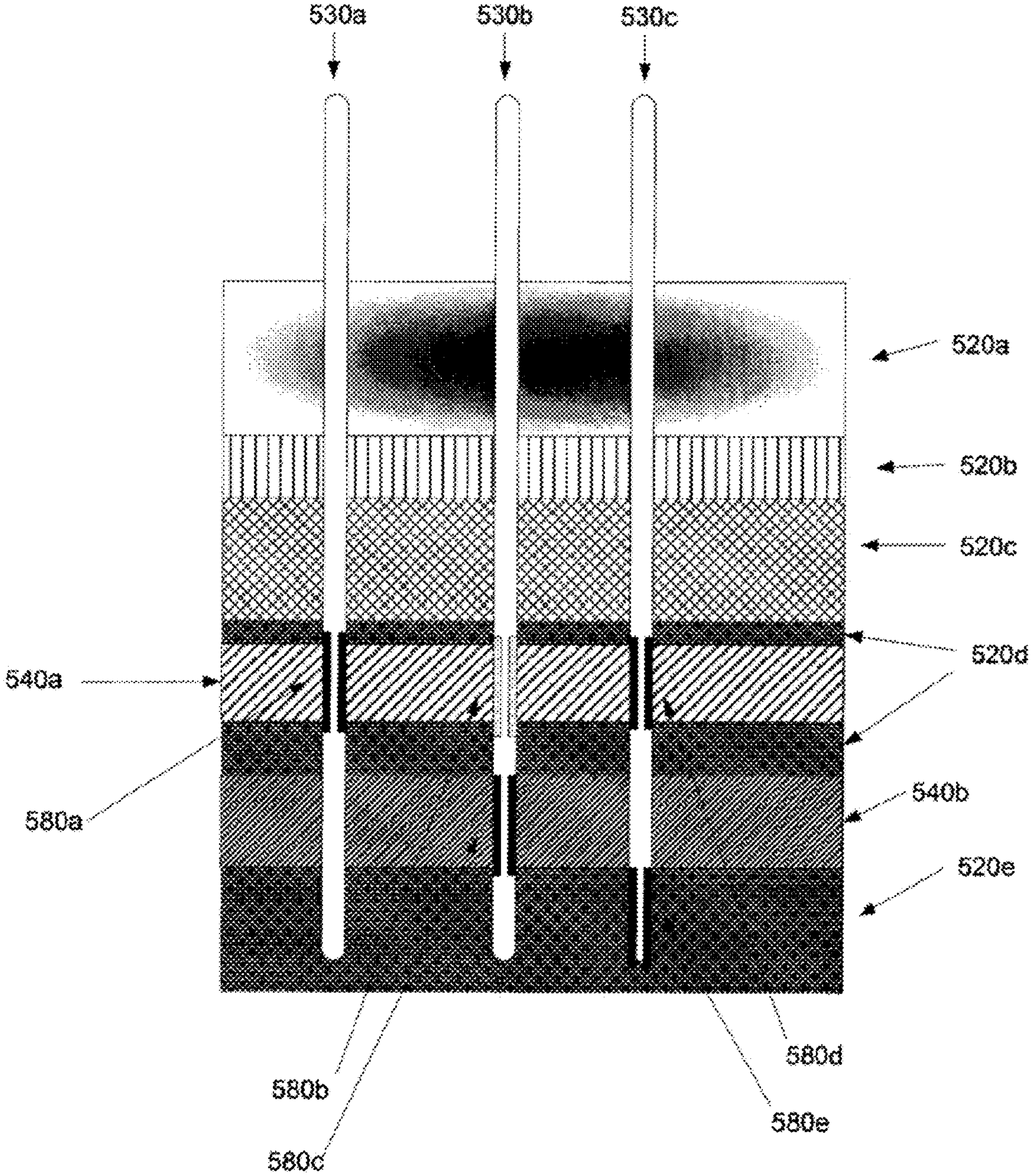
FIG. 5 illustrates various embodiments regarding the use of seals within bore wells in accordance with the present disclosure.
Figure 3A:
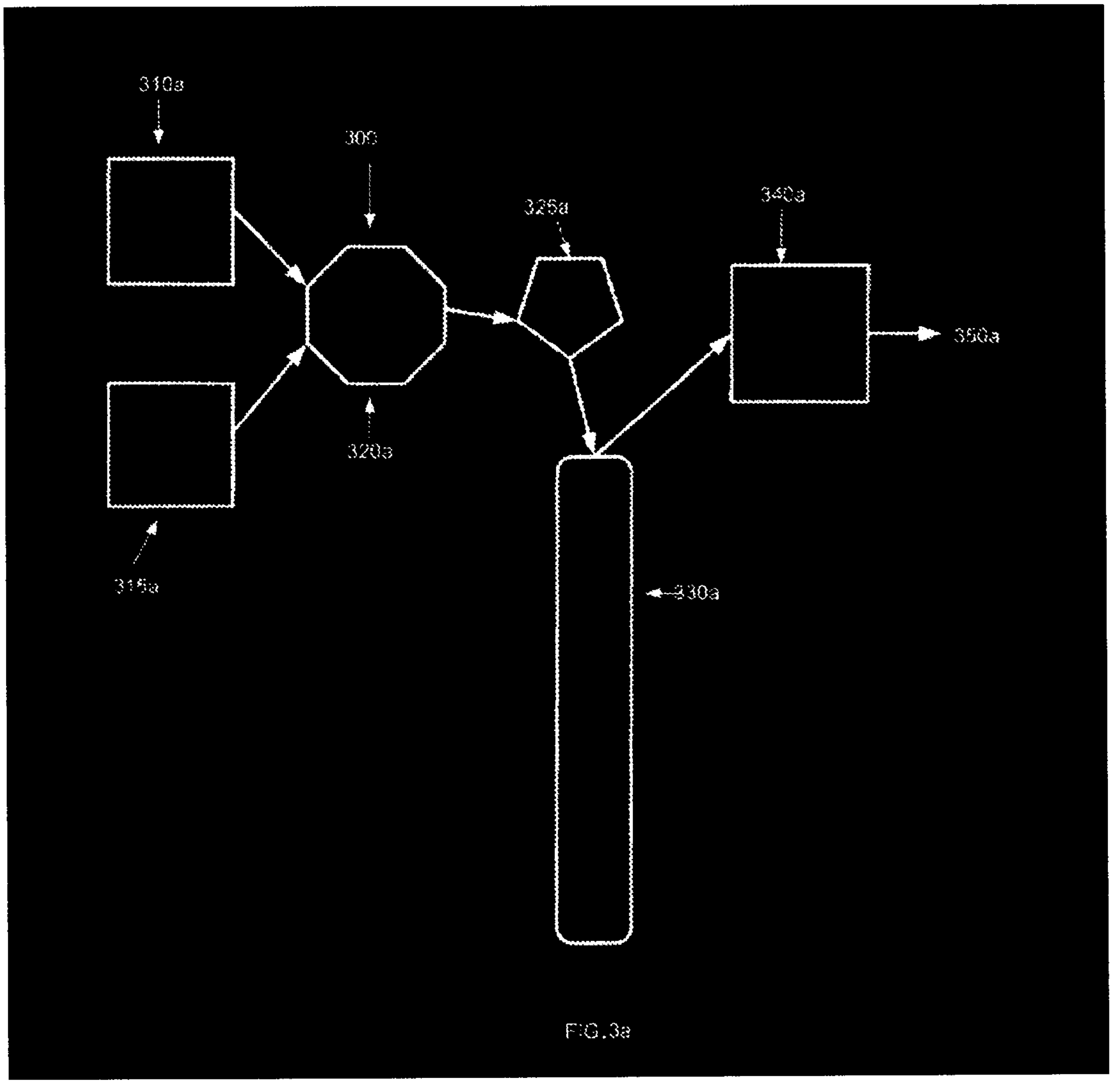
Figure 3B:
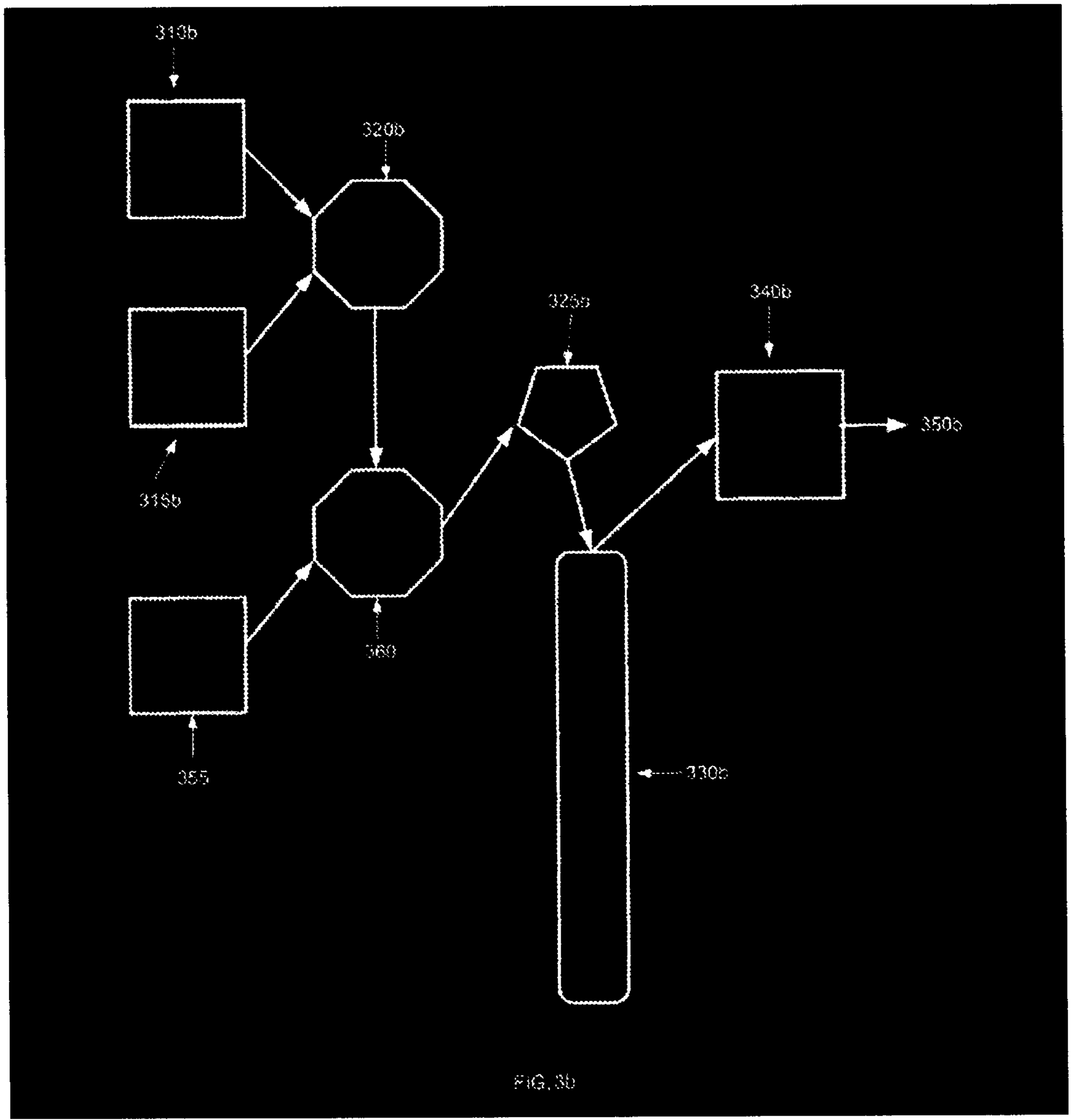
Figure 4:
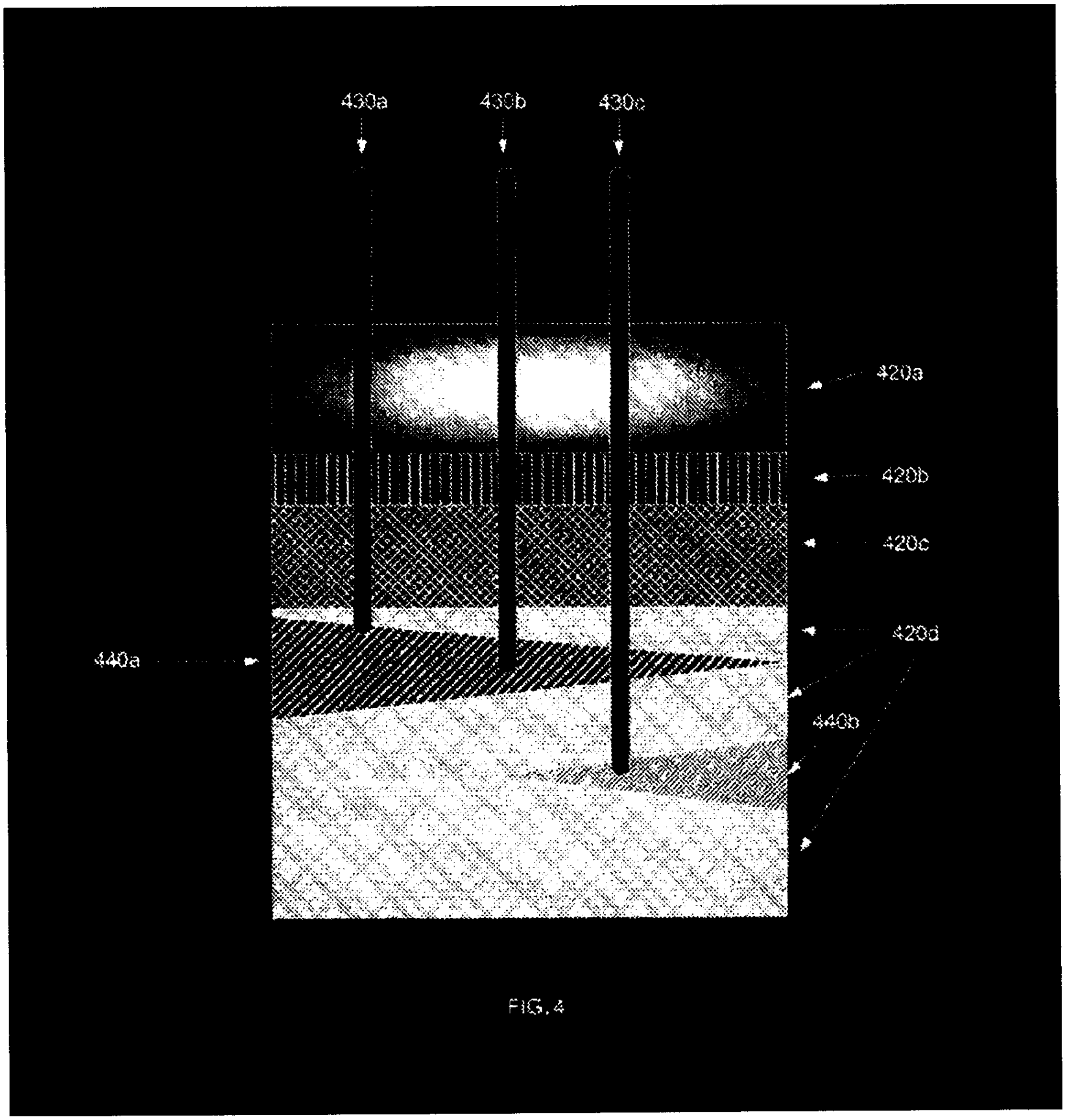
Figure 5:
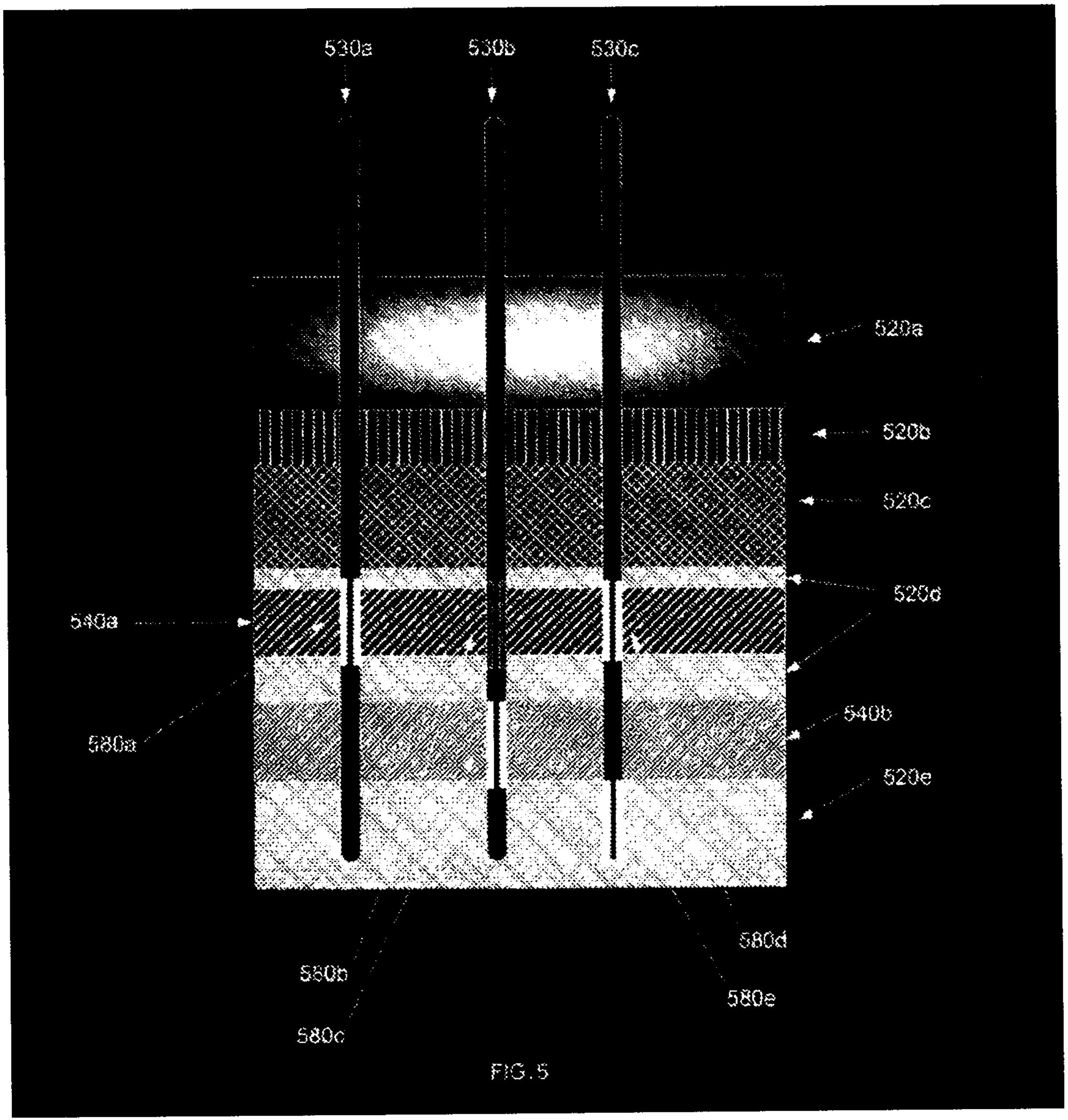

In a further embodiment, at least one seal is disposed into the bore well, as illustrated in FIG. 5. Non-limiting examples of such seals include mechanical packer seals and inflatable packer seals. The section of bedrock illustrated in FIG. 5 may include multiple strata or zones that do not contain water (520*a-e*) as well as zones containing water (540*a, b*). In some embodiments, it may be desirous to employ the fracking method on one water-bearing zone at a time. Thus, bore well (530*a*) illustrates the use of a seal (580*a*) inserted and activated at a depth to isolate one water-bearing zone (540*a*) while a second water-bearing zone (540*b*) is subjected to the fracking method. In one embodiment, the water from an underlying zone (540*b*) may then be retrieved in isolation from the overlaying zone (540*a*). In another embodiment (530*b*), the seal may be deactivated and moved from its first depth position (580*b*) and repositioned and reactivated at a second depth (580*c*). This may permit the fracking mixture to enter the overlying zone (540*a*) and isolate the underlying zone (540*b*). Multiple seals may also be used within the same bore well (530*c*). In this embodiment, it may be desirous to isolate an underlying water-bearing zone (540*b*) from an overlying water-bearing zone (540*a*), as well as prevent contaminants, such as hydrocarbons or salt-water, from entering the water from another zone (520*e*).

The fracking mixture previously disclosed, may be incorporated into a structure for recovering water from bedrock, the structure comprising a bore well extending from a land surface to, into, or through at least one zone of bedrock containing water, and a fracking mixture disposed within the bore well, the fracking mixture comprising, a supercritical fluid comprising at least 95% argon, and at least one proppant.

As previously disclosed, the fracking mixture may further comprise other components including at least one gas, at least one gel, and/or at lest one foaming agent. In another embodiment, the argon in the fracking mixture may comprise at least a portion of argon-37. In still another embodiment, the amount of gel included in the fracking mixture may be selected to impart a selected viscosity to the fracking mixture. In another embodiment, the temperature and pressure of the fracking mixture pumped into the bore well may be chosen so that the supercritical argon has a density about the same as the proppant. In yet another embodiment, the temperature and pressure of the fracking mixture pumped into the bore well may be chosen so that the supercritical argon has a density about the same as the foaming agent.

In order to illustrate the various features disclosed above, the following non-limiting examples are provided.

EXAMPLES

Example 1

Hydraulic Fracturing Material Comprising Ar and a Proppant

Argon (900 g, 22.5 mol) will be compressed to 500 atmospheres (50,662.5 KPa) at 80 degrees C. in a steel container containing 485 g of bauxite microspheres that have a density of 0.6 g/mL. Under these condition, the density of the supercritical Ar will approximately match the density of the proppant.

Example 2

Hydraulic Fracturing Material Comprising Ar, a Gel, and a Proppant

A supercritical mixture comprising Argon (900 g, 22.5 mol) and 47 g polyethylene spheres with a melting point at approximately 135 degrees C. will be heated to 150 degrees C. and compressed up to 600 atmospheres (60,795 KPa) under continuous mixing. To this supercritical mixture, 900 g of high strength bauxite microspheres (0.6 g/mL density) will be added. In this example, the amount of added proppant can range up to or equal to approximately 80% by weight/volume of the hydraulic fracturing material.

Example 3

Hydraulic Fracturing Material Comprising Ar, an Environmentally Benign Gas, a Gel, and a Proppant Argon (951 g, 23.8 mol) and krypton (50.3 g, 0.6 mol) will be mixed and compressed to 500 atmospheres (50,662.5 KPa) at 150 degrees C. To the supercritical mixture, 53 g polyethylene spheres (47.0 g) with a melting point at approximately 135 degrees C. will be added under continuous mixing. In addition, 925 g of high strength bauxite microspheres (0.6 g/mL density) will be added to the supercritical mixture.

Example 4

Hydraulic Fracturing Material Comprising Ar, a Proppant, a Gel, and a Foaming Agent The hydraulic fracturing material will comprise 95% Argon (900 g, 22.5 mol), 2.5% polyethylene microspheres (23.7 g) with a melting point at approximately 135 degrees C., and 2.5% cocamide MEA (23.7 g, 0.083 mol) under continuous mixing at 150 degrees C. and compressed to 500 atmospheres (50662.5 KPa). To this solution, 925 g of high strength bauxite microspheres (0.6 g/mL density) will be added.

Example 5

Equipment Used for Hydraulic Fracturing

For the fracturing material, components will be mixed using a vehicle-mounted automated mixing device, for example The Blender supplied by C.A.T. GmbH. The Blender comprises a 335.6 KW (450 HP) hydraulically driven pump and screw, with a discharge rate settable to 34 kg/sec. (4500 lbs/min). The pumping power required to inject the fracturing material into the bore well is determined by the product of the flow rate and the delivery pressure. As an example, for a flow rate of 0.265 $m^3$/sec (100 barrels per minute), at a pressure of 68,950 KPa (10,000 psi), 19,272 KW of pumping power will be required. Under these conditions, twelve truck-mounted Weir SPM triplex pumps, each driven by a 1678.5 KW (2250 BHP) water cooled Detroit Diesel engine via an Allison transmission will be used.

Example 6

Method Used for Hydraulic Fracturing

A bore well 725 meters deep, and then extending 7000 meters horizontally will be drilled through rock consisting of sandstone, limestone, shale, and clay. The vertical 725 meters of bore well will be lined with steel/class-A Portland cement to API specification 5CT, while the horizontal 7000 meters of bore will be lined with a series of 30 m long perforated steel blocks every 220 m. In this example, the total volume of the system will be ~6200 $m^3$. After the bore well has been drilled, its integrity will tested using cement bond logs (CBL) and variable density logs (VDL) that measure the travel time of sound waves through the casing and cement to the formation. Liquefied argon will be transported to the drilling site to be stored under 30,397.5 KPa (300 atm.) pressure. Supercritical argon will be mixed with high strength bauxite microspheres (Example 1) initially at 37° C. and 30,397.5 KPa (300 atm.); however, temperatures up to 80° C. may be reached during mixing and pressures up to 50,662.5 KPa (500 atm.) may be required. The pumps used to inject the fracturing material into the bore well will provide a flow rate of approximately 0.265 $m^3$/sec. (100 bpm) of supercritical argon fracturing composition at 51,710.7 KPa (7500 psi) down the bore well. Under these conditions, approximately 7 hours will be required to fill the bore with the supercritical argon hydraulic fracturing fluid. Alter the bore well is filled, the pressure of the well system will be monitored to determine when the fracturing cycle has completed, as detected by a drop in well pressure. In this example, it may take 28 hours for the pressure to drop, at which time the argon will be pumped out. After the fracturing cycle has completed, flow rates from the well will be tested. For a procedure similar to the one described in this example, the flow rate may increase by a factor of 6. Water retrieved using the supercritical argon mixture will be separated from the argon through a slow release of pressure (~0.017 $m^3$/sec); under such conditions, the argon will vaporizes and leave the water behind.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated in this disclosure, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, or compositions, which can, of course, vary. It is also to be understood that the terminology used in this disclosure is for the purpose of describing particular embodiments only, and is not intended to be limiting.

With respect to the use of substantially any plural and/or singular terms in this disclosure, those having skill in the art can translate from the plural to the singular and/or from the singular to the plural as is appropriate to the context and/or application. The various singular/plural permutations may be expressly set forth in this disclosure for sake of clarity.

It will be understood by those within the art that, in general, terms used in this disclosure, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number ( e.g., the bare recitation of "two recitations," without other modifiers, means at least two recitations; or two or more. recitations). Furthermore, in those instances where a convention analogous to "at least one of A, B, and C, etc." is, used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed in this disclosure also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed in this disclosure can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member.

From the foregoing, it will be appreciated that various embodiments of the present disclosure have been described for purposes of illustration, and that various modifications may be made without departing from the scope and spirit of the present disclosure. Accordingly, the various embodiments disclosed are not intended to be limiting, with the true scope and spirit being indicated by the following claims.

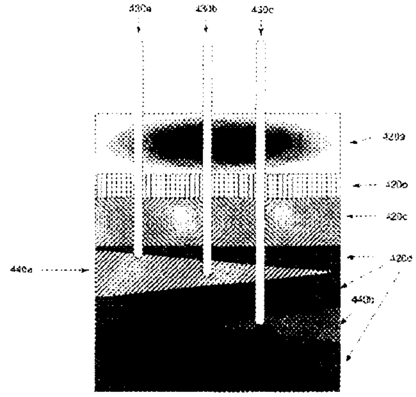

What is claimed is:

1. A system for extracting material from bedrock, the system comprising:

a source of a supercritical fluid comprising at least about 95% argon, wherein the supercritical fluid is at a temperature at or above about −122 degrees Celsius, and at a pressure at or above about 50 atmospheres (5,066 KPa);

a source of at least one proppant;

a mixing device, configured to mix the supercritical fluid and the proppant into a fracking mixture;

a bore well into the bedrock;

a pump configured to pump the fracking mixture into the bore well; and a recovery unit configured to recover the material from the bedrock.

2. The system of claim 1, wherein the argon comprises at least a portion of argon-37 ($^{37}Ar$).

3. The system of claim 1, further comprising a source of a gas, wherein:

the gas is krypton, xenon, nitrogen gas, carbon dioxide gas, water vapor, or any combination thereof; and the mixing device is configured to mix the gas into the fracking mixture.

4. The system of claim 1, further comprising a source of a gel, and wherein the mixing device is configured to mix the gel into the fracking mixture.

5. The system of claim 4, wherein an amount of gel included in the fracking mixture is selected to impart a desired viscosity to the fracking mixture.

6. The system of claim 1, wherein the supercritical fluid has a first density, the proppant has a second density, and the supercritical fluid is maintained at a temperature and a pressure wherein the first density is about the same as the second density.

7. The system of claim 1, further comprising a source of at least one foaming agent, and wherein the mixing device is configured to mix the foaming agent into the fracking mixture.

8. The system of claim 1 wherein the material comprises water or is water.

9. A method for recovering water from bedrock, the method comprising:

providing a bore well extending from a land surface at least to an at least one zone of bedrock having a portion of water therein;

providing a source of a supercritical fluid comprising at least about 95% argon, wherein the supercritical fluid is at a temperature at or above about −122 degrees Celsius, and at a pressure at or above about 50 atmospheres (5,066 KPa) before the pumping step;

providing a source of at least one proppant;

mixing the supercritical fluid and the proppant to provide a fracking mixture;

pumping the fracking mixture into the bore well;

allowing the fracking mixture to develop a plurality of fracture structures within the bedrock; and recovering water from the bore well.

10. The method of claim 9, wherein the argon comprises at least a portion of argon-37 ($^{37}Ar$).

11. The method of claim 10, further comprising tracing the $^{37}Ar$ within the bedrock.

12. The method of claim 9, further comprising mixing a gas into the fracking mixture, wherein the gas is krypton, xenon, nitrogen gas, carbon dioxide gas, water vapor, or any combination thereof.

13. The method of claim 9, further comprising mixing a gel into the fracking mixture.

14. The method of claim 13, further comprising mixing an amount of gel into the fracking mixture in order to impart a selected viscosity to the fracking mixture.

15. The method of claim 9, further comprising pumping the fracking mixture into the bore well at a temperature and a pressure wherein the supercritical fluid has a density about the same as a density of the at least one proppant.

16. The method of claim 9, further comprising mixing at least one foaming agent into the fracking mixture.

17. The method of claim 9, wherein the zone of bedrock comprises a plurality of zones of bedrock, each of the plurality of zones of bedrock having a portion of water therein.

18. The method of claim 17 further comprising inserting at least one seal to at least a first depth of the bore well, and activating the seal, thereby isolating at least one of the plurality of zones of bedrock having a portion of water therein from at least a second of the plurality of zones of bedrock having a portion of water therein.

19. The method of claim 18 further comprising deactivating the seal, moving the seal to at least a second depth of the bore well, and reactivating the seal.

20. A structure for recovering water from bedrock, the structure comprising:

a bore well extending from a land surface at least to an at least one zone of bedrock having a portion of water therein; and a fracking mixture disposed within the bore well, the fracking mixture comprising, a supercritical fluid comprising at least 95% argon, wherein the supercritical fluid is at a temperature at or above about −122 degrees Celsius, and at a pressure at or above about 50 atmospheres (5,066 KPa) when the fracking mixture is initially disposed within the bore well, and at least one proppant.

21. The structure of claim 20, wherein the argon comprises at least a portion of argon-37 ($^{37}Ar$).

22. The structure of claim 20, wherein the fracking mixture further comprises a gas selected from the group consisting of krypton, xenon, nitrogen gas, carbon dioxide gas, water vapor, and any combination thereof.

23. The structure of claim 20, wherein the fracking mixture further comprises a gel.

24. The structure of claim 23, wherein an amount of gel included in the fracking mixture is selected to impart a desired viscosity to the fracking mixture.

25. The structure of claim 20, wherein the supercritical fluid has a first density, the proppant has a second density, and the supercritical fluid is initially disposed within the bore well at a temperature and pressure wherein the first density is about the same as the second density.

26. The structure of claim 20, further comprising mixing at least one foaming agent into the fracking mixture.

* * * * *

UNITED STATES PATENT AND TRADEMARK OFFICE

CERTIFICATE OF CORRECTION

PATENT NO. : 9,004,172 B2
APPLICATION NO. : 13/512700
DATED : April 14, 2015
INVENTOR(S) : Carlson et al.

It is certified that error appears in the above-identified patent and that said Letters Patent is hereby corrected as shown below:

The title page showing the illustrative figure should be deleted to be replaced with the attached title page.

On Page 2, item (56), under "OTHER PUBLICATIONS", in Column 1, Line 25, delete "dioxid(1)" and insert -- dioxide(1) --, therefor.

In the drawing sheets, consisting of Figs. 3a, 3b, 4, and 5, should be deleted to be replaced with the drawing sheets, consisting of Figs. 3a, 3b, 4, and 5, as shown on the attached pages.

In the specification,

In Column 1, Lines 8-9, delete "35 U.S.C. §371" and insert -- 35 U.S.C. § 371 --, therefor.

In Column 1, Lines 9-10, delete "PCT/US2011/050236filed" and insert -- PCT/US2011/050236 filed --, therefor.

In Column 1, Line 10, delete "2011entitled" and insert -- 2011, entitled --, therefor.

In Column 4, Line 11, delete "tetrafluroethylene," and insert -- tetrafluoroethylene, --, therefor.

In Column 4, Line 53, delete "cross-linked. amylose." and insert -- cross-linked amylose. --, therefor.

In Column 6, Line 53, delete "non water bearing" and insert -- non-water-bearing --, therefor.

In Column 6, Line 67, delete "at lest" and insert -- at least --, therefor.

In Column 7, Line 58, delete "at lest" and insert -- at least --, therefor.

In Column 10, Line 40, delete "or more. recitations)." and insert -- or more recitations). --, therefor.

Signed and Sealed this
Thirteenth Day of October, 2015

Michelle K. Lee

Michelle K. Lee
*Director of the United States Patent and Trademark Office*

(12) United States Patent
Carlson et al.

(10) Patent No.: US 9,004,172 B2
(45) Date of Patent: Apr. 14, 2015

(54) SYSTEMS, MATERIALS, AND METHODS FOR RECOVERING MATERIAL FROM BEDROCK USING SUPERCRITICAL ARGON COMPOSITIONS

(75) Inventors: William B. Carlson, Seattle, WA (US); Gregory D. Phelan, Cortland, NY (US)

(73) Assignee: Empire Technology Development LLC, Wilmington, DE (US)

(*) Notice: Subject to any disclaimer, the term of this patent is extended or adjusted under 35 U.S.C. 154(b) by 328 days.

(21) Appl. No.: 13/512,700

(22) PCT Filed: Sep. 1, 2011

(86) PCT No.: PCT/US2011/050236
§ 371 (c)(1),
(2), (4) Date: May 30, 2012

(87) PCT Pub. No.: WO2013/032482
PCT Pub. Date: Mar. 7, 2013

(65) Prior Publication Data
US 2013/0056205 A1 Mar. 7, 2013

(51) Int. Cl.
*E21B 43/267* (2006.01)
*C09K 8/70* (2006.01)
*C09K 8/80* (2006.01)

(52) U.S. Cl.
CPC ................ *E21B 43/267* (2013.01); *C09K 8/70* (2013.01); *C09K 8/80* (2013.01)

(58) Field of Classification Search
None
See application file for complete search history.

(56) References Cited

U.S. PATENT DOCUMENTS 3,937,283 A * 2/1976 Blauer et al. .................. 166/307
4,186,802 A 2/1980 Perlman
4,566,539 A 1/1986 Perlman
5,325,921 A 7/1994 Johnson et al.
6,260,621 B1 7/2001 Furman et al.
7,059,405 B2 * 6/2006 Farabee et al. ............ 166/250.1
7,980,312 B1 7/2011 Hill et al.
(Continued)

FOREIGN PATENT DOCUMENTS

DE 19903243 A1 8/2000
EP 1844850 A1 10/2007
(Continued)

OTHER PUBLICATIONS

International Search Report and Written Opinion for PCT/US2011/050236 dated Feb. 1, 2012.
(Continued)

*Primary Examiner* — Zakiya W Bates
(74) *Attorney, Agent, or Firm* — Foley & Lardner LLP

(57) ABSTRACT

A material to be used for hydraulic fracturing, comprising argon maintained as a supercritical fluid, and a proppant. The material may also include any one of a variety of gels, foaming agents, and/or gases. The material may be used in a system to recover resources from bedrock, the system comprising the fracturing material, at least one mixer, a pump to inject the material into a bore well, and a recovery unit to recover the resource from the well. The material and system may be used in a variety of methods for extracting resources from bedrock, the method including mixing the proppant with the supercritical argon to form a mixture, pumping the mixture into a bore well, and recovering the resource from the bore well. Additionally, the material and bore well may comprise a structure used in the extraction of resources from bedrock.

26 Claims, 6 Drawing Sheets